US011260453B2

(12) United States Patent
Haberland et al.

(10) Patent No.: US 11,260,453 B2
(45) Date of Patent: Mar. 1, 2022

(54) METHOD FOR ADDITIVE PRODUCTION, COMPONENT, AND APPARATUS FOR ADDITIVE PRODUCTION

(71) Applicant: Siemens Energy Global GmbH & Co. KG, Munich (DE)

(72) Inventors: Christoph Haberland, Bochum (DE); Andreas Kreutzer, Berlin-Hellersdorf (DE); Heiko Lammers, Berlin (DE); Thomas Lorenz, Berlin (DE); Martin Regener, Berlin (DE); Kathrin Sperlich, Berlin (DE); Danny Tomuschat, Potsdam (DE)

(73) Assignee: Siemens Energy Global GmbH & Co KG, Munich (DE)

( * ) Notice: Subject to any disclaimer, the term of this patent is extended or adjusted under 35 U.S.C. 154(b) by 465 days.

(21) Appl. No.: 15/776,914

(22) PCT Filed: Nov. 25, 2016

(86) PCT No.: PCT/EP2016/078840
§ 371 (c)(1),
(2) Date: May 17, 2018

(87) PCT Pub. No.: WO2017/102286
PCT Pub. Date: Jun. 22, 2017

(65) Prior Publication Data
US 2018/0326486 A1 Nov. 15, 2018

(30) Foreign Application Priority Data
Dec. 17, 2015 (DE) .......................... 102015225652.9

(51) Int. Cl.
*B33Y 10/00* (2015.01)
*B29C 64/40* (2017.01)
(Continued)

(52) U.S. Cl.
CPC .............. *B22F 10/20* (2021.01); *B22F 5/009* (2013.01); *B29C 64/00* (2017.08); *B29C 64/10* (2017.08);
(Continued)

(58) Field of Classification Search
None
See application file for complete search history.

(56) References Cited

U.S. PATENT DOCUMENTS

2004/0056022 A1  3/2004  Meiners et al.
2006/0118532 A1  6/2006  Chung et al.
(Continued)

FOREIGN PATENT DOCUMENTS

CA    2825648 A1    8/2012
CN    103338881 A   10/2013
(Continued)

OTHER PUBLICATIONS

DE Search Report dated Dec. 9, 2016, for DE patent application No. 102015225652.9.
(Continued)

*Primary Examiner* — Armand Melendez

(57) ABSTRACT

A method for additive production of a component, which includes the additive construction of the component on a component platform having an opening, wherein, during the first part of the additive construction of the component an auxiliary structure is produced additively around the opening of the component platform. The method further includes the introduction of a device through the opening into a cavity defined by the auxiliary structure, wherein, during a second part of the additive construction, following the first part of the additive construction, properties of the component to be produced are influenced and/or measured by the device. A component is produced by the method and an apparatus for
(Continued)

the additive production of the component, includes the component platform having the opening and the closure.

6 Claims, 2 Drawing Sheets

(51) Int. Cl.
*B22F 10/20* (2021.01)
*B22F 5/00* (2006.01)
*B29C 64/153* (2017.01)
*B29C 64/141* (2017.01)
*B29C 64/245* (2017.01)
*B29C 64/00* (2017.01)
*B29C 64/268* (2017.01)
*B29C 64/10* (2017.01)
*B33Y 30/00* (2015.01)
*B33Y 80/00* (2015.01)

(52) U.S. Cl.
CPC .......... *B29C 64/141* (2017.08); *B29C 64/153* (2017.08); *B29C 64/245* (2017.08); *B29C 64/268* (2017.08); *B29C 64/40* (2017.08); *B33Y 10/00* (2014.12); *B33Y 30/00* (2014.12); *B33Y 80/00* (2014.12); *Y02P 10/25* (2015.11)

(56) References Cited

U.S. PATENT DOCUMENTS

| | | |
|---|---|---|
| 2013/0309420 A1 | 11/2013 | Flesch et al. |
| 2015/0196971 A1 | 7/2015 | Schneider et al. |
| 2016/0107263 A1 | 4/2016 | Koerber |
| 2018/0079003 A1 | 3/2018 | Lin et al. |

FOREIGN PATENT DOCUMENTS

| | | | |
|---|---|---|---|
| CN | 103726049 A | 4/2014 | |
| CN | 104550953 A | 4/2015 | |
| CN | 104759623 A | 7/2015 | |
| CN | 104772458 A | 7/2015 | |
| CN | 105108144 A | 12/2015 | |
| DE | 102011005929 A1 | 9/2012 | |
| DE | 102013212620 A1 | 12/2014 | |
| DE | 102013214485 A1 * | 2/2015 | ............ B22F 3/1055 |
| DE | 102013214485 A1 | 2/2015 | |
| EP | 1355760 B1 | 5/2005 | |
| EP | 2581154 A1 | 4/2013 | |
| JP | 2010100884 A | 5/2010 | |

OTHER PUBLICATIONS

International Search Report dated Mar. 2, 2017, for PCT/EP2016/078840.

* cited by examiner

METHOD FOR ADDITIVE PRODUCTION, COMPONENT, AND APPARATUS FOR ADDITIVE PRODUCTION

CROSS REFERENCE TO RELATED APPLICATIONS

This application is the US National Stage of International Application No. PCT/EP2016/078840 filed Nov. 25, 2016, and claims the benefit thereof. The International Application claims the benefit of German Application No. DE10,2015/225652.9 filed Dec. 17, 2015. All of the applications are incorporated by reference herein in their entirety.

FIELD OF INVENTION

The present invention relates to a method for additive production, to a component produced or producible by said method, and to an apparatus for the additive production of the component. The component can be, for example, a turbine component, for example for a part from a nickel-based or cobalt-based super alloy of a gas turbine.

BACKGROUND OF INVENTION

The additive or generative manufacturing of workpieces is in most instances performed by a primary shaping process, for example by means of powder-bed-based methods. Known methods include in particular selective laser melting (SLM), selective laser sintering (SLS), and electron beam melting (EBM). In the case of the methods mentioned, the component is constructed tier-by-tier in a powder bed by melting particles that form the powder bed by an energized beam, such as for example an electron beam or a laser beam.

A method of the type stated at the outset is known, for example, from EP1 355 760 B 1.

Additive production methods, on account of the iterative vertical or horizontal joining of layer or volume elements, are used for the production of three-dimensional objects, and are applied in the sector of prototyping and in the meantime also in the production of components, in particular in the manufacturing of individually shaped components. A multiplicity of different materials are available as source materials which can be present in pulverulent or granular form, or else also in the form of fluids, for example as suspensions. The three-dimensional object in the case of additive or generative production methods is formed by a multiplicity of individual material layers which are sequentially deposited on a component platform that is capable of being lowered, and are subsequently individually subjected to a localized selective solidification process.

In the case of the SLM process, the heat that is introduced, for example, by a laser is dissipated only by way of the component, optionally by way of supporting structures and by way of the base plate or component platform. As compared thereto, the surrounding powder bed has a substantially lower thermal conductivity and can be considered as being almost thermally isolating. In particular in the case of projecting structures of the component, this in a localized manner can lead to high temperatures and thus to damage to the component or even to the production installation or apparatus. In the worst case, warping and/or collisions with one of the coating apparatuses of the system could arise, for example.

To date, for example, the material quality of components produced by casting methods, in particular in the production of turbine blades, has not yet been able to be achieved by additive methods. In particular, the structure of additively produced components in terms of warping, grain sizes, and/or structural defects is unfavorable as compared to structures which are produced or producible by casting, a crystal growing method, or another method for targeted solidification.

Currently, hot additive methods having operating temperatures of more than 1000° C. are being developed, on account of which, for example, rapid cooling of the metal melt that is problematic in terms of the material structure of the component is prevented, and thus a microstructure that in terms of quality is comparable to that of a casting method can be achieved.

SUMMARY OF INVENTION

It is therefore an object of the present invention to specify means by way of which properties of at least a part of the component to be produced can be positively influenced or improved, for example in terms of the microstructure.

This object is achieved by the subject matter of the independent claims. Advantageous design embodiments are the subject matter of the dependent patent claims.

One aspect of the present invention relates to a method for the additive production of a component, comprising the additive construction of a component on a component platform having a advantageously closable opening. The opening can be closable by a closure. During a first part of the additive construction of a component, thus quasi "in situ", an auxiliary structure is additively produced around the opening of the component platform. The auxiliary structure is advantageously produced entirely or along the entire circumference around the opening of the component platform.

The auxiliary structure is furthermore advantageously constructed directly beside the component to be additively produced, or at a minor spacing therefrom. The production process of the auxiliary structure is advantageously one and the same, such that the auxiliary structure is constructed from the same material as the component.

The method furthermore comprises introducing a device through the opening into a cavity defined by the auxiliary structure.

The method furthermore comprises influencing and/or detecting, in particular measuring, properties of the component to be produced by the device during a second part of the additive construction that is subsequent to the first part of the additive construction.

The mentioned influencing can be, for example, warming or heating, respectively, or cooling or chilling the component to be produced.

The mentioned detecting advantageously relates to a measuring method, for example for measuring the temperature or for measuring vibrations of the component.

The mentioned properties can relate to the component to be produced, or only to a portion of the component that is disposed in manner spaced apart from the component platform, or a portion of the component that is produced or to be produced in a manner spaced apart from the component platform.

The first part of the additive construction of the component advantageously relates to a construction phase of the component in which the auxiliary structure is also simultaneously conjointly constructed.

The second part of the additive construction advantageously relates to a construction phase of the component in which the auxiliary structure has already been completed or constructed.

By way of the method described, influence can be exerted by means of the device and advantageously during the construction on the state or the properties, for example the microstructure, of the component to be produced.

A further aspect of the present invention relates to an apparatus for the additive production of a component, comprising the component platform having the opening and a closure. The closure is configured for closing the opening. Furthermore, the component platform of the apparatus is advantageously configured so as to be capable of being lowered relative to the closure.

In one design embodiment, the apparatus comprises the described device, wherein the opening and/or the device are/is configured in such a manner that the device can be pushed or introduced, for example from below, through the opening, for example into a production space of the apparatus.

In one design embodiment, the device is or comprises an endoscope. This design embodiment is particularly advantageous in the case of particularly small components to be additively produced, which offer only little space for the introduction of the device. The opening of this design embodiment in this instance is expediently dimensioned in a corresponding manner.

In one design embodiment, the device is a measuring device, for example for measuring the temperature or for measuring vibrations.

In one design embodiment, the device is a temperature measuring device for measuring the temperature of the component or of a portion of the latter. Accordingly, the device can comprise, for example, a thermal element, a pyrometer, or further sensors.

In one design embodiment, the device is a vibration measuring device for measuring vibrations of the component or of a portion of the latter. Accordingly, the device can comprise, for example, a piezoelectric sensor.

In one design embodiment, the device is or comprises a heating device and/or a cooling device for heating or cooling, respectively, the component or a portion of the latter.

In one design embodiment, the opening at the beginning of the additive construction of the component is or will be closed by a closure. The closure in this state, conjointly with the component platform, advantageously forms a common construction or production area. The closure can be a closure piston, a stopper, or, for example, a slide.

In one design embodiment, the component platform, at least during the first part of the additive construction of the component, is lowered relative to the closure. On account thereof, the cavity or the hollow within the auxiliary structure can be established in the case of a powder-bed-based additive production method, since the space defined by the auxiliary structure can be kept free or substantially free of powder by way of this design embodiment.

In one design embodiment, the closure subsequently, that is to say advantageously after the first part of the additive construction of the component, or after the completion of the auxiliary structure, is removed from the opening.

In one design embodiment, the component to be produced, or for example, only a portion of the component that is to be produced in a manner (so as to be disposed) spaced apart from the component platform, is heated and/or cooled by the device during the second part of the additive construction.

As has already been indicated above, heating can be expedient in order to prevent rapid cooling or cooling down of the component, and to thus configure or achieve a particularly advantageous microstructure of the component that is, for example, low in defects or favorable for an application of the component.

By contrast, cooling the component to be produced, or a portion of the latter, can be advantageous in order for the heat dissipation of the laser beam, and thus for an expedient solidification of the molten powder, to be enabled and for the production to thus be likewise optimized.

In one design embodiment, the temperature of a portion of the component that is to be produced in a manner spaced apart from the component platform, or of the entire component, is measured and set by heating or cooling by the device. Accordingly, the device, as has been indicated above, is advantageously configured for measuring the temperature and for regulating the temperature in a corresponding manner.

In one design embodiment, the component during the additive construction, for example the second or final part of the construction, is provided with a projecture or an undercut. According to this design embodiment, the mentioned projecture advantageously defines the cavity on an upper side. The upper side advantageously refers to a side of the cavity and/or of the auxiliary structure that in the construction direction of the component lies on top. According to this design embodiment, the auxiliary structure advantageously only defines lateral walls or a shelf face of the cavity. Accordingly, the auxiliary structure per se can be opened on the upper side and can have been or be closed by the projecting portion of the component. In other words, for example viewed in a plan view of the component platform, the projecture, or a projecting or protruding portion of the component to be additively produced can surpass the opening.

In one design embodiment, the component to be produced is additively constructed in such a manner that said component has an aspect ratio, advantageously relative to a construction direction of the component, of at least 2:1. The aspect ratio advantageously describes the ratio of a height or depth of the component to be produced in the construction direction, in relation to a lateral dimension, for example a dimension that is parallel with a surface of the component platform. According to this design embodiment, the auxiliary structure has advantageously already been produced having a closed upper side and is not necessarily closed by a projecting portion of the component.

In one design embodiment, the component to be produced is at least in part formed by the auxiliary structure. The component to be produced can likewise have been or be completely formed by the auxiliary structure. This design embodiment relates to a component to be produced or to be additively constructed which per se, that is to say owing to the pre-defined shape thereof, has a hollow structure or a cavity. On account of the corresponding design embodiment of the apparatus and/or of the component platform, this hollow geometry or cavity can then specifically be utilized for influencing or detecting, for example, properties of the component by means of the device, as has been described above.

In one design embodiment, the method is or comprises a powder-bed-based production method, for example a method for selective laser melting or electron beam melting.

A further aspect of the present invention relates to a component which is produced or is producible by the described method. It is to be ensured by way of the invention that the temperature gradient is reduced by implementing local heating in the cooling of the component, on the one hand, and a uniform temperature profile in the component is generated, on the other hand, by implementing local heating and/or cooling devices. In comparison to a component that is to be additively produced in a conventional manner the component furthermore comprises a reduced density of structural defects, imperfections, and/or grain boundaries, and advantageously reduced residual stresses and accordingly less evidence of warping and bonding defects, in particular between the component platform and the component.

Design embodiments and or advantages which presently relate to the method for additive production and/or to the component, can likewise relate to the apparatus, and vice versa.

Further details of the invention will be described hereunder by means of the drawing. The same or equivalent elements in the drawings are in each case provided with the same reference signs in the individual figures and are only discussed repeatedly in as far as there are points of differentiation between the individual figures.

BRIEF DESCRIPTION OF THE DRAWINGS

FIGS. 1 to 6 describe in particular various method steps of a method for the additive production of a component according to a first embodiment.

FIG. 7 indicates a part of a method for the additive production of a component according to an embodiment that is an alternative to that of FIGS. 5 and 6.

DETAILED DESCRIPTION OF INVENTION

Figure 1:
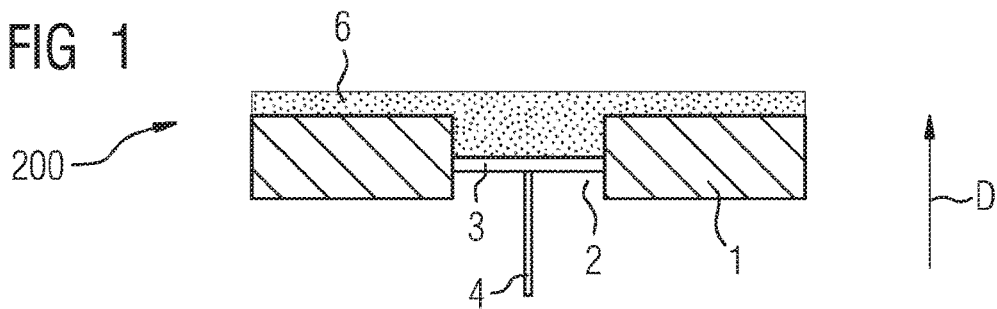
FIGS. 1 to 7 show in each case a simplified schematic sectional view of an apparatus for the additive production of a component.

FIG. 1 schematically shows at least a part of an apparatus 200 for the additive production of a component 100 (cf. FIGS. 2 to 7). The component 100 is in particular a component having a complex structure or contour, or an elongate and/or curved component.

The apparatus 200 is in particular an apparatus or a system for an additive, for example powder-bed-based production method such as a method for selective laser melting (SLM) and/or electron beam melting (EBM).

The apparatus 200 comprises a component platform 1. The component platform 1 can be a substrate on which a workpiece or a component is constructed layer-by-layer in the context of the additive production. The component platform in commonplace respective apparatuses is usually and advantageously capable of being lowered relative to further components of the apparatus, for example to an exposure or laser apparatus. The component platform 1 has an opening 2. The opening 2 in an exemplary manner is disposed centrally in the component platform 1. When viewed in the plan view of the component platform 1, the opening can have a multiplicity of shapes, for example be configured so as to be square or rectangular, however advantageously circular.

A closure 3 is disposed in the opening 2. The closure 3 is advantageously configured for closing the opening 2 in a tight fit or in a powder-tight manner. The closure 3 comprises, for example, a piston (not explicitly identified). The closure 3 furthermore comprises a piston rod 4 by way of which the closure 3 can be disposed advantageously vertically or along a construction direction (cf. direction D). The closure can furthermore be a piston, a plug, a closure piston, or a slide.

Furthermore, powder 6 is shown on the closure 3 and on the component platform 1 in FIG. 1. The powder is advantageously a metal powder which in the context of an SLM method is sourced for the construction of components. The powder herein is usually distributed tier-by-tier or layer-by-layer at a specified layer thickness on the component platform by way of a slide or a spreading blade. For example, a continuous powder layer which can be constructed or produced in a first solidification step is illustrated on the component platform 1 in FIG. 1. Alternatively to the illustration in FIG. 1, the closure can be disposed along the construction direction in such a manner that the component platform 1 and the closure 3 form a flat basic area for the production of a component.

The space above the component platform 1 advantageously describes a production space (not explicitly identified).

Figure 2:
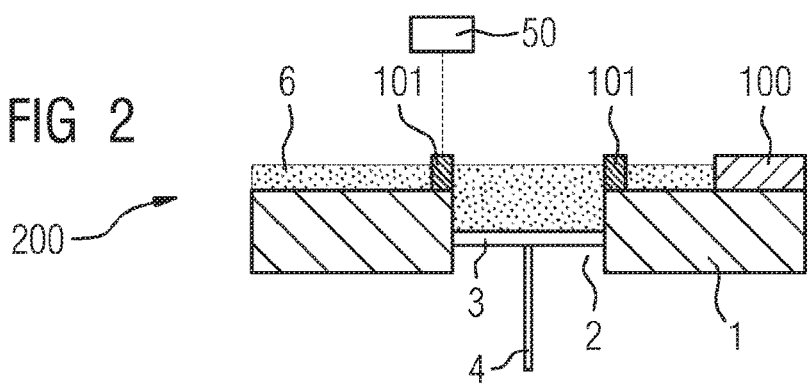

FIG. 2, additionally to FIG. 1, shows a laser 50 or a respective laser device, by way of which powder is initially used in a punctiform and layer-by-layer manner on the component platform 1 and/or the closure 3, and subsequently can be solidified for the respective component to be produced. In order for the latter to be produced, the laser 50 or the laser beam in the respective illustration is aligned or focused toward an auxiliary structure 101. The auxiliary structure 101 is advantageously additively constructed around the opening 2.

A component 100 (cf. right-hand periphery of FIG. 2) is produced successively layer-by-layer, simultaneously with the auxiliary structure 101, advantageously by the same method. Accordingly, the auxiliary structure 101 and the component 100 are advantageously made from the same material. The material can be, for example, the basic material of a nickel-based or cobalt-based super alloy for the production of components in the hot gas path of a gas turbine.

A situation in which both the first layer of the auxiliary structure 101 as well as the first layer of the component 100 have already been exposed and solidified by the laser beam is described in particular in FIG. 2.

The reference sign 100 in a synonymous manner advantageously describes the component to be produced as well as the component 100 produced or partially produced.

Figure 3:
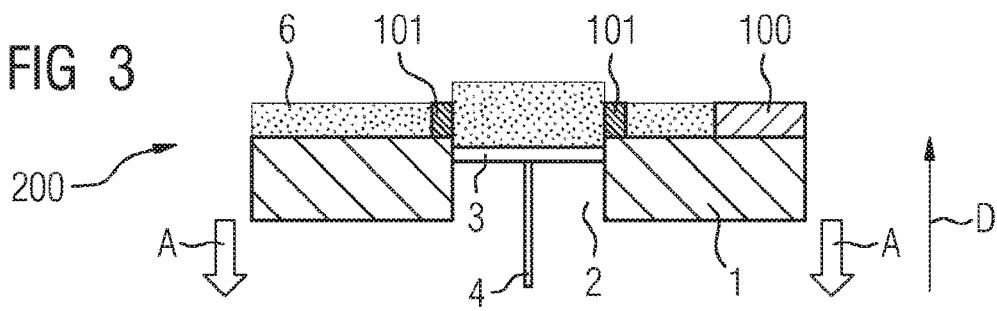

As opposed to FIG. 2, FIG. 3 shows a situation in which the component platform 1 has been lowered relative to the closure 3, for example by the layer thickness of an individual tier. Accordingly, the apparatus 200 comprises an arrester mechanism on account of which the closure 3 is not conjointly lowered. The lowering is indicated by the two arrows identified as A on the sides of the component platform 1. It can be likewise seen that in relation to the situation in FIG. 2 a further powder tier is or has been applied in the context of a conventional SLM method, for example. On account of the fact that the closure 3 has not been lowered conjointly with the component platform 1, excess powder which can project in relation to the powder disposed on the component platform can accumulate on the closure 3, as is indicated.

While reference presently is made only to an SLM method, the inventive concept can likewise be applied to further methods, for example EBM.

Figure 4:
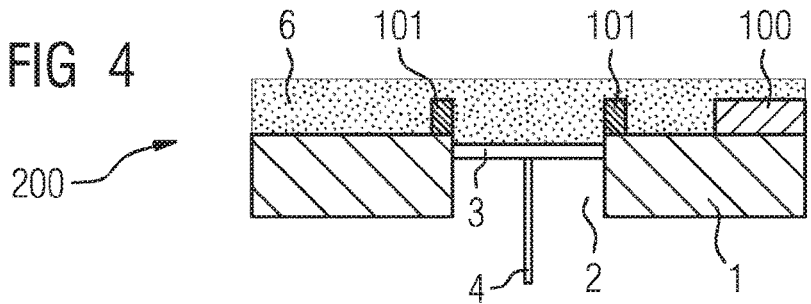

FIG. 4 indicates that in relation to the illustration in FIG. 3, a further powder tier has been up applied and/or spread smooth, for example by means of the spreading blade described or a coating apparatus, said powder tier subsequently being able to be exposed and solidified by way of the laser 50 (cf. FIG. 2).

In order for the individually designed component 100 to be constructed, the method steps described by means of FIGS. 2 to 4 can in particular be repeated successively.

Figure 5:
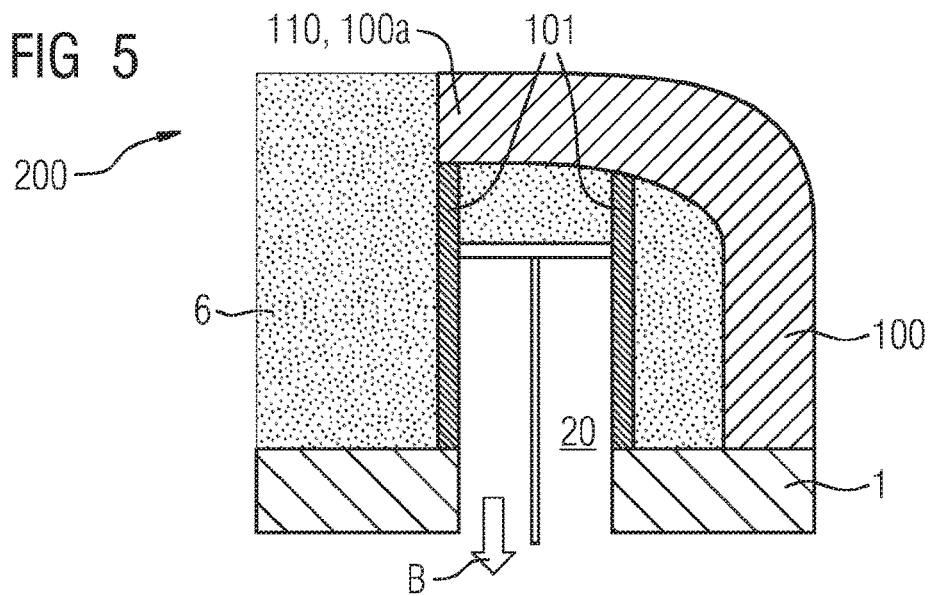

The additive construction of the component 100 as well as of the auxiliary structure 101 in the illustration of FIG. 5 has already progressed far or already been completed. It can be seen in particular that the component 100 has a portion 100*a* and/or a projecture 110 which on an upper side protrudes beyond the auxiliary structure 101 or terminates said auxiliary structure 101.

On account of the closure 3 not having been conjointly lowered relative to the component platform 1 in each individual construction step (in which in each case one tier of material in pulverulent form has been applied and solidified), a cavity 20 has formed at least under the piston of the closure.

The region 100*a* mentioned, or the projecture 110, respectively, accordingly defines the cavity 20 at least on an upper side. The cavity 20 is furthermore defined or delimited by the auxiliary structure 101, for example on the lateral or shell faces.

It can furthermore be seen in FIG. 5 that regions in the production space in which no material has been solidified, for example, are filled with powder 6.

As further method steps of the described method for additive production, it is indicated by the arrow B in FIG. 5 that the closure 3, advantageously after completely defining the cavity 20, has been removed from the cavity 20, or from the opening 2, respectively. This is advantageously performed so as to include the powder remaining on the piston of the closure 3.

The time period up to which the cavity 20 has been defined or completed, for example since the beginning of the construction by the auxiliary structure 101 and the portion 100*a* of the component 100, advantageously describes a first part of the additive construction of the component 100.

The temporal point as from which the cavity 20 is completed, for example by the auxiliary structure 101 and the portion 100*a* of the component 100, and in which the component 100 continues to be constructed without the construction of the auxiliary structure 101, advantageously describes a second part of the additive construction of the component 100.

Figure 6:
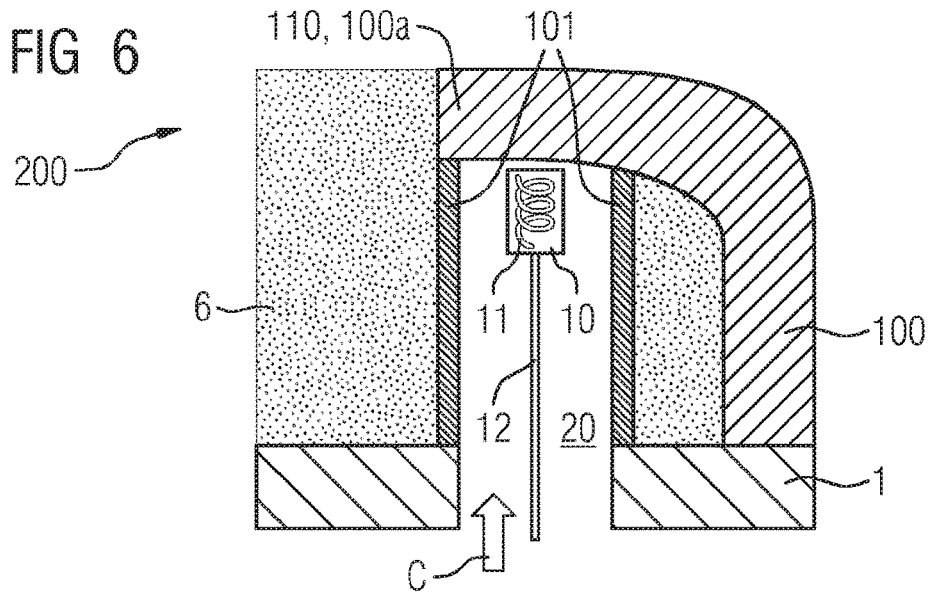

It is indicated in FIG. 6 that the closure 3 has been removed from the cavity 20, and the cavity 20 is likewise free of powder. It is indicated by the arrow C that a device 10 has been introduced into the completely hollow cavity. By way of the method described to this point, it can be advantageously achieved that a side, a region or surface of the component 100, in particular by way of the additive construction of the auxiliary structure 101, is now rendered accessible, for example for influencing or detecting properties of the component 100.

When reference is presently made to the component, a portion 100*a* of the component 100 that is spaced apart from the component platform 1, and/or the projecture 110 or the projecting portion, can likewise be referenced, and vice versa.

The device 10 can be, for example, a device for measuring vibrations and accordingly comprise a piezoelectric sensor, for example.

Alternatively or additionally, the device 10 can be a temperature measuring device and accordingly comprise a thermal element or a Pyro meter for measuring the temperature of the projecture 110. Additionally, the device 10 can comprise a heating device and/or a cooling device. The device 10 can furthermore comprise a temperature regulator such that the component 100 can be maintained at a predetermined temperature, for example. This can be particularly advantageous for the configuration of a particularly advantageous microstructure of the component 100 or of the respective portion of the latter.

Alternatively or additionally, the device can initiate further effects.

A heating resistor 11 by way of which the projecture 110 of the component 100 can be heated or warmed, for example, is shown in the device 10 in FIG. 6. As has already been indicated above, rapid cooling and thus configuration of imperfections or fissures in the material of the component can be prevented or limited by such heating. The device 10 can furthermore comprise an endoscope 12 in order for said device 10 to be introduced into the cavity 20 in a space-saving manner.

According to the illustration in FIG. 6, the component 100 is advantageously not yet fully constructed and/or produced.

As soon as the cavity in the progress of the construction has been fully closed or been continuously configured, properties of the component 100 can be influenced or detected by the device 10 so as to favor the desired component or the structure of the latter.

Figure 7:
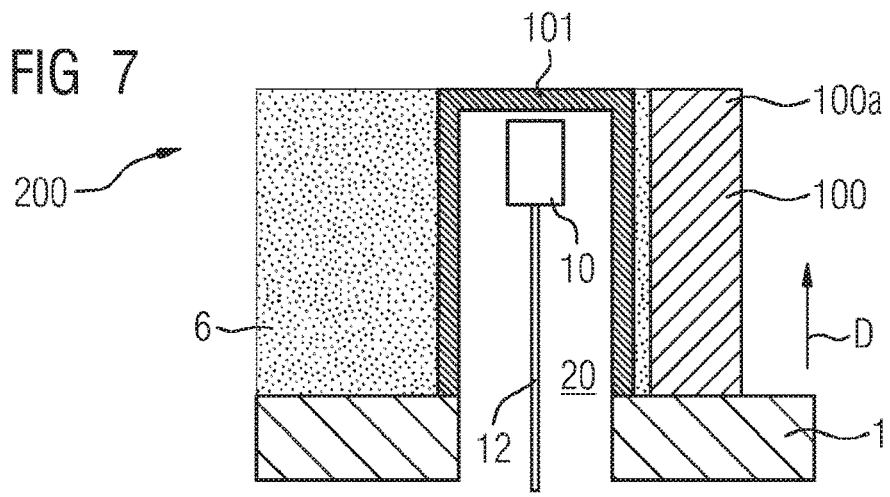

FIG. 7 schematically shows a design embodiment of the method and/or of the component that is an alternative to the description to date, in a manner analogous to the state of the method indicated in FIG. 6. As opposed to the illustration from FIG. 6, the cavity 20 according to this design embodiment is entirely defined or delimited by the auxiliary structure 101.

In other words, this design embodiment of the method is an upper side of the auxiliary structure 101 that has been constructed in only an auxiliary manner.

As an alternative to the powder-bed-based method, an additive production method which, for example, utilizes a liquid initial material instead of a pulverulent initial material, can be used for the present invention.

This design embodiment is in particular expedient for the additive production of components which on account of the desired geometrical parameters or of the purpose of said components do not have any substantial projectures. The illustrated device 10 can be designed or chosen according to the description pertaining to FIG. 6. In spite of this, a temperature measurement or heating of the component, for example, is not as effective as compared to the design embodiment from FIG. 6, since the device 10 is in contact with the component 100 only indirectly and not in a direct physical manner. Nevertheless, better access to a portion of the component that is currently to be processed is likewise enabled by the described method, on account of which the production method is simplified, for example, and/or the microstructure of the component can be improved. This design embodiment is furthermore advantageously expedient in the case of components which have a high aspect ratio, for example an aspect ratio of 2:1 or more, since the inventive advantage of the method, or of the described apparatus 200, respectively, has a greater effect as the spacing from the component platform increases.

A further embodiment of the method and/or of the component, not explicitly identified in the figures, relates to a component to be produced which at least in part or entirely is formed by the auxiliary structure. According to this design embodiment, the component that is to be additively constructed, that is to say by virtue of the predefined form of said component, can per se have a hollow structure or a cavity. On account of the respective design embodiment of the apparatus and/or of the component platform, this hollow geometry or cavity can then specifically be utilized for influencing or detecting, for example, properties of the component by means of the device, as has been described above.

The invention by way of the description by means of the exemplary embodiments is not limited to the latter, but comprises each new feature and any combination of features. This includes in particular any combination of features in the patent claims, even when said feature or said combination is not explicitly specified in the patent claims or the exemplary embodiments.

The invention claimed is:

1. A method for the additive production of a component, comprising: additively constructing a component on a component platform having an opening, wherein during a first part of the additive construction of the component an auxiliary structure is additively produced beside the component on the component platform and fully surrounding the opening of the component platform so that the auxiliary structure is a separate structure from the component, wherein the opening at the beginning of the additive construction of the component is closed by a closure, wherein the component platform during the first part of the additive construction of the component is lowered relative to the closure, and the closure is removed after the first part of the additive construction, and during a second part of the additive construction, subsequent to the first part of the additive construction, when a cavity defined by the auxiliary structure and the component is complete: introducing a device through the opening into a cavity defined by the auxiliary structure after the component has been built on the auxiliary structure and is directly above the cavity, and influencing and/or detecting properties of the component to be produced by the device.

2. The method as claimed in claim 1, wherein the component to be produced is heated or cooled by the device during the second part of the additive construction.

3. The method as claimed in claim 1, wherein the temperature of a portion that is to be produced in a manner spaced apart from the component platform is measured and/or set by heating or cooling by the device.

4. The method as claimed in claim 1, wherein the component during the additive construction is provided with a projecture, and wherein the projecture defines the cavity.

5. The method as claimed in claim 1, wherein the component to be produced is additively constructed in such a manner that said component has an aspect ratio of at least 2:1.

6. The method as claimed in claim 1, wherein the method is a powder-bed-based production method or a method for selective laser melting.

* * * * *